United States Patent
Murias et al.

(10) Patent No.: US 10,024,480 B2
(45) Date of Patent: Jul. 17, 2018

(54) REINFORCED PLUG

(71) Applicants: Adrian Murias, Mercer Island, WA (US); Richard Tran, Bothell, WA (US)

(72) Inventors: Adrian Murias, Mercer Island, WA (US); Richard Tran, Bothell, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/658,773

(22) Filed: Mar. 16, 2015

(65) Prior Publication Data
US 2015/0184783 A1 Jul. 2, 2015

Related U.S. Application Data

(62) Division of application No. 13/789,223, filed on Mar. 7, 2013.

(51) Int. Cl.
*B25B 5/14* (2006.01)
*F16L 55/11* (2006.01)
*F16L 55/115* (2006.01)

(52) U.S. Cl.
CPC .......... *F16L 55/1141* (2013.01); *B25B 5/147* (2013.01); *F16L 55/11* (2013.01); *F16L 55/115* (2013.01); *Y10T 29/4987* (2015.01); *Y10T 29/49826* (2015.01); *Y10T 29/49872* (2015.01)

(58) Field of Classification Search
CPC ...... F16L 55/11; F16L 55/115; F16L 55/1141; B25B 5/147; Y10T 29/49826; Y10T 29/4987; Y10T 29/49872
USPC ...... 29/449–451; 138/89, 96 R, 96 T, DIG. 5
See application file for complete search history.

(56) References Cited

U.S. PATENT DOCUMENTS

| | | | | |
|---|---|---|---|---|
| 1,726,166 A | * | 8/1929 | Sparks | H01R 13/443 439/148 |
| 2,385,055 A | * | 9/1945 | Breslove | B25B 7/20 138/96 R |
| 2,551,834 A | * | 5/1951 | Ferguson | B29C 41/14 138/96 T |
| 2,644,978 A | * | 7/1953 | Becker | A47B 91/04 138/89 |
| 2,705,336 A | * | 4/1955 | Wilson | B25G 3/30 138/89.4 |
| 2,727,651 A | * | 12/1955 | Mickelson | B65D 41/0414 138/96 T |
| 2,889,089 A | * | 6/1959 | Herrick | F16L 37/008 222/540 |
| 3,077,904 A | * | 2/1963 | Rusche | F16L 55/1141 138/89 |
| 3,080,787 A | | 3/1963 | Bertelsmann | |
| 3,082,485 A | * | 3/1963 | Thomas | B29C 45/14754 156/196 |
| 3,157,056 A | | 11/1964 | Gray | |
| 3,307,552 A | * | 3/1967 | Strawn | A61M 39/20 138/89 |

(Continued)

*Primary Examiner* — Bayan Salone
(74) *Attorney, Agent, or Firm* — Christensen O'Connor Johnson Kindness PLLC

(57) ABSTRACT

A method includes providing a die having a cylindrical body terminating in a rounded end, wrapping a fibrous material around the die while the fibrous material is tensioned, wherein the fibrous material is placed to extend in a continuous manner across the width of the rounded end of the body and to opposite sides of the cylindrical body, applying a curable resin on the die, curing the resin, and removing a reinforced cured resin plug from the die.

10 Claims, 5 Drawing Sheets

(56) References Cited

U.S. PATENT DOCUMENTS

| | | | | |
|---|---|---|---|---|
| 3,448,772 A * | 6/1969 | Delamater | ......... | F16L 55/1141<br>138/89 |
| 3,466,067 A * | 9/1969 | Orain | ...... | F16L 33/00<br>285/244 |
| 3,476,154 A * | 11/1969 | Ludeman | .............. | F16L 55/115<br>138/89 |
| 3,574,312 A | 4/1971 | Miller | | |
| 3,606,073 A * | 9/1971 | Burke | ................... | B65D 59/00<br>138/96 T |
| 3,807,457 A * | 4/1974 | Logsdon | ............. | F16L 55/1141<br>138/89 |
| 3,813,098 A * | 5/1974 | Fischer | ..................... | F16L 9/08<br>138/141 |
| 3,938,237 A * | 2/1976 | Dunz | ...................... | F16J 3/042<br>285/242 |
| 4,425,945 A * | 1/1984 | McDonald | ............ | F16L 57/005<br>138/96 T |
| 4,483,371 A * | 11/1984 | Susin | ...................... | F16L 35/00<br>138/89 |
| 4,836,397 A * | 6/1989 | Fowles | ..................... | A61J 1/10<br>206/364 |
| 4,952,429 A * | 8/1990 | Schmitz | ................. | H02K 5/128<br>138/109 |
| 5,004,016 A * | 4/1991 | Kliewer | ................ | B65D 59/06<br>138/110 |
| 5,028,056 A * | 7/1991 | Bemis | .................... | B29C 70/086<br>138/89 |
| 5,044,404 A | 9/1991 | Watson | | |
| 5,224,515 A * | 7/1993 | Foster | .................... | B65D 59/06<br>138/89 |
| 5,252,165 A * | 10/1993 | Fecto | .................... | B29C 70/222<br>156/228 |
| 5,287,892 A | 2/1994 | Sanderson et al. | | |
| 5,318,075 A * | 6/1994 | Roll | ....................... | F16L 55/11<br>138/89 |
| 5,379,802 A * | 1/1995 | VanderLans | ......... | F16L 55/128<br>138/89 |
| 5,388,870 A * | 2/1995 | Bartholomew | ..... | F16L 27/0816<br>285/242 |
| 5,520,219 A | 5/1996 | Hessian | | |
| 5,534,318 A * | 7/1996 | Andre De La Porte | ............................... | B29C 70/00<br>220/562 |
| 5,597,430 A * | 1/1997 | Rasche | ................ | B29B 15/122<br>156/161 |
| 5,638,870 A * | 6/1997 | Takada | ................. | B29C 70/085<br>138/125 |
| 5,763,973 A * | 6/1998 | Cramer | ................ | F04D 13/025<br>310/103 |
| 5,803,126 A | 9/1998 | Zaro | | |
| 5,928,736 A * | 7/1999 | Parekh | .................. | B29C 53/587<br>428/34.5 |
| 6,039,827 A * | 3/2000 | Cramer | ................ | H02K 49/106<br>156/169 |
| 6,293,772 B1 * | 9/2001 | Brown | .................. | F04D 29/041<br>415/122.1 |
| 6,325,108 B1 * | 12/2001 | Bettinger | ................ | F16L 9/133<br>138/153 |
| 6,692,038 B2 * | 2/2004 | Braun | .................. | F16L 37/1205<br>285/319 |
| 6,712,153 B2 * | 3/2004 | Turley | ................ | E21B 33/1208<br>166/118 |
| 7,124,831 B2 * | 10/2006 | Turley | ................ | E21B 33/1208<br>166/118 |
| 7,128,154 B2 * | 10/2006 | Giroux | .................... | E21B 33/16<br>166/155 |
| 7,213,727 B2 * | 5/2007 | Kokubo | ............ | B65D 47/0838<br>215/320 |
| 7,487,801 B2 * | 2/2009 | Zeyfang | ................ | F16L 55/115<br>138/89 |
| 7,644,734 B2 * | 1/2010 | Palmer | ................ | F16L 55/1157<br>138/89 |
| 7,662,334 B2 * | 2/2010 | Miller | .................... | B29C 51/28<br>264/301 |
| 7,677,270 B2 * | 3/2010 | Horan | ............ | F16L 55/1108<br>138/89 |
| 7,727,593 B2 * | 6/2010 | Zeyfang | ................ | F16L 55/115<br>138/89 |
| 8,011,391 B2 * | 9/2011 | Heritier | ................ | E21B 17/006<br>138/96 R |
| 8,057,617 B2 * | 11/2011 | Fujimoto | ............... | A63B 53/10<br>156/187 |
| 8,397,764 B2 * | 3/2013 | Palmer | ................ | F16L 57/005<br>138/89 |
| 8,916,073 B2 * | 12/2014 | Rydin | .................... | B29C 41/08<br>264/136 |
| 9,103,479 B2 * | 8/2015 | Kertesz | ................ | F16L 33/22 |
| 9,410,656 B2 * | 8/2016 | Murias | ................ | F16L 55/115 |
| 9,611,969 B2 * | 4/2017 | Murias | ................ | F16L 55/115 |
| 2001/0015510 A1 * | 8/2001 | Nakamura | ............ | B29C 31/002<br>264/159 |
| 2004/0251025 A1 * | 12/2004 | Giroux | .................... | E21B 33/16<br>166/291 |
| 2008/0029176 A1 | 2/2008 | Horan | | |
| 2009/0050230 A1 * | 2/2009 | Heritier | ................ | F16L 57/005<br>138/96 R |
| 2009/0090078 A1 * | 4/2009 | Smart | ................ | F16L 57/005<br>52/301 |
| 2009/0226719 A1 * | 9/2009 | Molina | ...................... | C08J 5/24<br>428/367 |
| 2010/0037970 A1 * | 2/2010 | Palmer | ................ | F16L 57/005<br>138/89 |
| 2010/0037977 A1 * | 2/2010 | Rahimzadeh | ......... | F16L 55/115<br>138/96 R |

* cited by examiner

REINFORCED PLUG

CROSS-REFERENCE TO RELATED APPLICATION

This application is a division of U.S. patent application Ser. No. 13/789,223, filed Mar. 7, 2013, the entire disclosure of which is expressly incorporated herein by reference.

BACKGROUND

Many vehicles, including semi-tractors, rely on hoses to convey fluids to and from different parts of the engine's cooling system, brake system, lubrication system, hydraulic system, air-conditioning system, and the like. Many of the systems are designed to leave open hose connector terminations for future use. In order to prevent fluids from being discharged through these extra hose connector terminations, plugs made of rubber are provided on the terminals. A problem arises since rubber may deteriorate over a period of time due to thermal cycling and pressure. Alternatively, the extra hose connector terminations have to be permanently sealed through welding, for example, and the entire part must be replaced in order to be able to connect a hose at that location.

Accordingly, there is a long-felt need for robust and long-lasting hose connector termination plugs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Some embodiments are related to a method of making a reinforced resin plug. The method includes providing a die having a cylindrical body terminating in a curved or rounded end, wrapping a fibrous material around the die during or while the fibrous material is tensioned, wherein the fibrous material is placed to extend in a continuous manner across the width of the rounded end of the body and to opposite sides of the cylindrical body, applying a curable resin on the die, curing the resin, and removing a reinforced cured resin plug from the die.

In the embodiments related to the method of making a reinforced resin plug, the die may further include a pole connected to the cylindrical body, wherein the pole extends perpendicular to a longitudinal axis of the cylindrical body.

In the embodiments related to the method of making a reinforced resin plug, removing the plug includes cutting the cured fiber-reinforced resin plug around the circumference of the die on both sides of the pole to produce two reinforced resin plugs.

In the embodiments related to the method of making a reinforced resin plug, the fibrous material can be applied before the curable resin.

In the embodiments related to the method of making a reinforced resin plug, the curable resin can be applied before the fibrous material.

In the embodiments related to the method of making a reinforced resin plug, the curable resin and the fibrous material can be applied together.

In the embodiments related to the method of making a reinforced resin plug, the method may further include tensioning the fibrous material when the fibrous material is applied on the die.

In the embodiments related to the method of making a reinforced resin plug, the fibrous material can include spun filaments.

In the embodiments related to the method of making a reinforced resin plug, the fibrous material can include a continuous filament.

In the embodiments related to the method of making a reinforced resin plug, the fibrous material can be a mesh of interconnected filaments.

In the embodiments related to the method of making a reinforced resin plug, the curable resin can be an elastomer, such as, but not limited to silicone, ethylene propylene diene monomer, or rubber.

Some embodiments are related to a reinforced plug. The reinforced plug may include a hollow cylindrical body closed by a rounded end portion and open at the opposite end, wherein the plug comprises tensioned fibrous material that extends in a continuous manner across the width of the rounded end and to the sides of the body.

In the embodiments related to the reinforced plug, the fibrous material may include a plurality of discrete filaments, at least one or more extending in a continuous manner across the width of the rounded end and to the sides of the body.

In the embodiments related to the reinforced plug, the fibrous material may include a mesh.

In the embodiments related to the reinforced plug, the plug may include more than one layer, each layer having tensioned fibrous material and resin.

In the embodiments related to the reinforced plug, the plug may include at least one layer having a cured resin and further includes the fibrous material within the resin.

In the embodiments related to the reinforced plug, the plug may include more than one layer of cured resin and fibrous material.

Some embodiments are related to a method for closing a conduit connector termination. The method includes placing a plug made from a reinforced resin on a conduit connector termination, wherein the plug comprises a hollow cylindrical body closed by a rounded end portion and open at the opposite end, wherein the open end is placed over the conduit connector termination; placing a clamp on the plug that compresses the plug body to the conduit connector termination, wherein the plug comprises a tensioned fibrous material that extends across the width of the rounded end and to the sides of the body in a continuous manner.

In the embodiments related to a method for closing a conduit connector termination, the pressure inside the conduit connector termination applies a force on an inside surface of the rounded end of the plug, and the force is partly transferred via the fibrous material to a body portion being compressed by the clamp, thereby providing for added strength.

In the embodiments related to a method for closing a conduit connector termination, the conduit connector termination can be a hose barb.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Plugs are used to seal the open ends of conduit connector terminations of vehicles, for example. A conduit connector termination may be a barbed connector termination to which a hose can be connected. The need for plugs arises out of a desire to have additional conduit connector terminations for possible future additions to an engine's cooling system, brake system, lubrication system, hydraulic system, air-conditioning system, and the like. Typically, these extra conduit connector terminations are closed off using a rubber plug or even welded shut. However, rubber has a tendency to degrade over time due to thermal and pressure cycling, and welding creates a need to replace entire parts. Accordingly, this application discloses a plug made from a resin including reinforcing fibers. The disclosed plugs can be manufactured in a variety of diameters, lengths, and shapes to provide for the variety of currently available conduit connector terminations.

Figure 1:
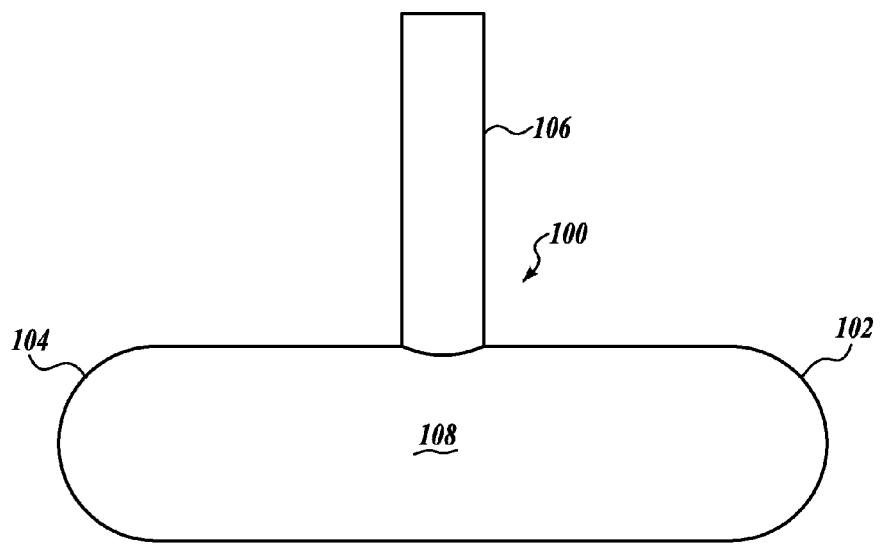
FIG. 1 is a diagrammatical illustration of a die for making a reinforced resin plug.

Referring to FIGS. 1-6, a method of making a fiber-reinforced resin plug will now be described. FIG. 1 shows a diagrammatical illustration of a die 100 having a cylindrical body 108 terminating in opposite curved or rounded ends 102 and 104. The die 100 can be solid or hollow. In one embodiment, the die 100 may include a pole 106 attached perpendicular to the longitudinal axis of the cylindrical body 108.

The diameter of the die 100 can be slightly smaller than the diameter of the conduit connector termination for which the plug is intended. In some embodiments, the die 100 may be a cylindrical member having two ends. The ends may be flat or the ends may be rounded as shown in the figures. The die 100 includes an elongated pole 106 attached generally at the center of the cylindrical body 108 and perpendicular to the cylindrical body 108. The pole 106 is used to support the die 100 during the wrapping of fibrous material and coating of the fibrous material with the resin. The die 100 may be made of metal, such as stainless steel or carbon steel, plastics, or ceramics.

Before using the die in making plugs, the die 100 may be coated with a mold release. Suitable mold releases may include, but are not limited to, fluoropolymers, such as polytetrafluoroethylene (Teflon®), silicone-based oils, and the like.

Figure 2:
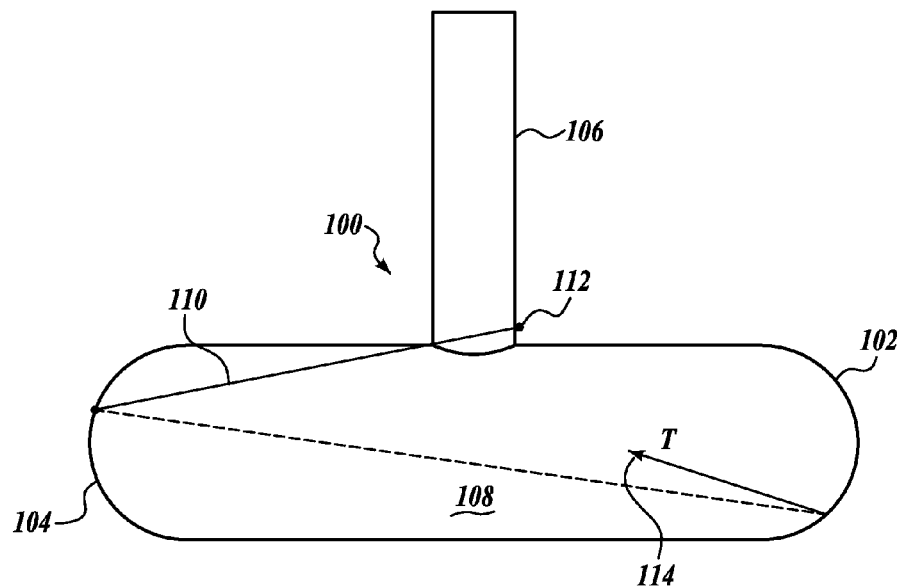
FIG. 2 is a diagrammatical illustration of a step in a method of making the reinforced resin plug.

FIG. 2 shows a step in a method of making a reinforced resin plug. In FIG. 2, one end of a continuous fibrous material 110 may be attached to a starting point 112, such as where the pole 106 connects to the cylindrical body 108. A purpose for rigidly attaching the fibrous material 110 is so that the fibrous material 110 may be tensioned while being applied over the die 100. Tension can refer to a force to stretch the fibrous material during application or a force that renders the fibrous material 110 taut during the application.

In some embodiments, the fibrous material 110 can be a continuous thread made from individual staple fibers, such as through twisting or spinning. In some embodiments, the fibrous material 110 can be a single continuous filament such as is typically made from synthetic polymers, such as nylon.

In some embodiments, the fibrous material 110 may be wrapped by hand. However, in other embodiments, the fibrous material 110 can be wrapped around the die 100 by machine, similar to a winding machine. With a machine, the fibrous material 110 may be provided on a spool, wherein the spool creates drag upon unwinding, thereby applying tension as the fibrous material 110 is wrapped around the die 100. In some embodiments, the fibrous material 110 is wrapped a multiplicity of times, such that with each wrap, the fibrous material 110 extends from one end 102 of the die to the opposite end 104 in a lengthwise fashion or generally along the longitudinal axis. The fibrous material 110 can extend continuously from approximately the center of the die 100, around at least one rounded end 102, 104, and extend to the opposite center on the other side of the die 100. The purpose is to create a multiplicity of filaments that extend from the center of the die on one side, around the end, and to the opposite center side to add strength. In addition to filaments placed longitudinally on the die 100, filaments of the fibrous material 110 may also be wrapped circumferentially on the die 100. Additionally, filaments of the fibrous material 110 may be wrapped both circumferentially and along the length of the die 100. Preferably, the fibrous material 110 is continuous and extends in a continuous manner and a multiplicity of times on the die 110 from the cylindrical body 108, across at least one rounded end 102, 104, and extends back to the cylindrical body 108 on the opposite side. It is desirable that the fibrous material extend from one side of the cylindrical body 108 across the rounded end or ends 102, 104 and back to the cylindrical body 108. In this manner, the plug is able to withstand the forces experienced at the interior of the rounded end, wherein the fibers act to transfer the forces to the cylindrical body, which can then be clamped to the conduit connector termination. This allows the load-bearing portions at the ends of the plug to redistribute the forces along reinforcing filaments to the portion of the plug being held to the conduit connector termination via the clamp, as described in more detail below.

Figure 3:
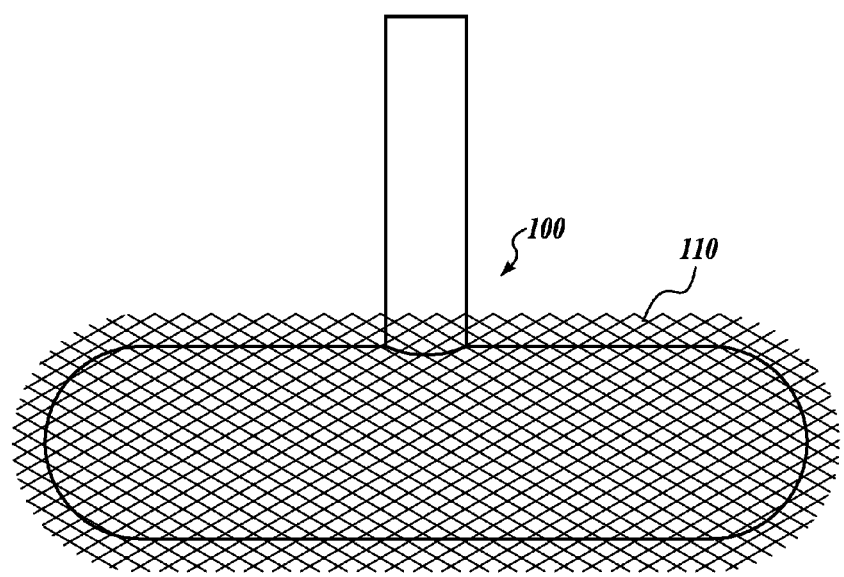
FIG. 3 is a diagrammatical illustration of a step in a method of making the reinforced resin plug.

Referring to FIG. 3, the fibrous material 110 has been wrapped a multiplicity of times over the die 100. The fibrous material 110 creates continuous filaments extending at least from one side of the cylindrical body 108 across the width of at least one rounded end and continues to the opposite side of the cylindrical body 108. This wrapping of continuous filaments of fibrous material 110 is done a multiplicity of times to cover at least one end of the cylindrical body and preferably the two ends. The covering of the rounded ends 102, 104 with fibrous material 110 may be complete or partial covering.

Figure 4:
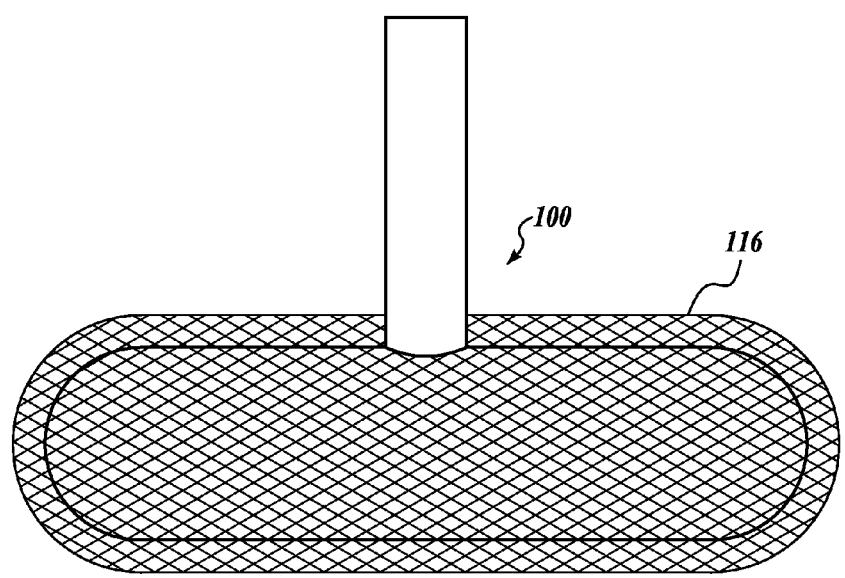
FIG. 4 is a diagrammatical illustration of a step in a method of making the reinforced resin plug.

Referring to FIG. 4, a curable resin 116 is applied onto the die 100 over the fibrous material 110. In some embodiments, the resin 116 is applied after applying the fibrous material 110. In some embodiments, the resin 116 may be applied before applying the fibrous material 110. In some embodiments, the fibrous material 110 and the resin 116 may be applied together. In the latter case, the resin and fibrous material may be applied by what are known as pre-preg (pre-impregnated) materials. After applying the resin 116, the resin is allowed to cure. The cure may be conducted at room temperature or, alternatively, the cure may be artificially accelerated, such as by placing in a heated oven. Suitable resins include elastomers and may include synthetic and natural resins. Elastomers include silicone rubber, butyl rubber, ethylene propylene rubber, ethylene propylene diene rubber, polyisoprene rubber, polybutadiene rubber, nitrile rubber, and the like. The resin 116 may include one or more polymers or monomers, curing agents, or catalysts. The methods of curing or preparing the foregoing resins are known in the art.

Figure 5:
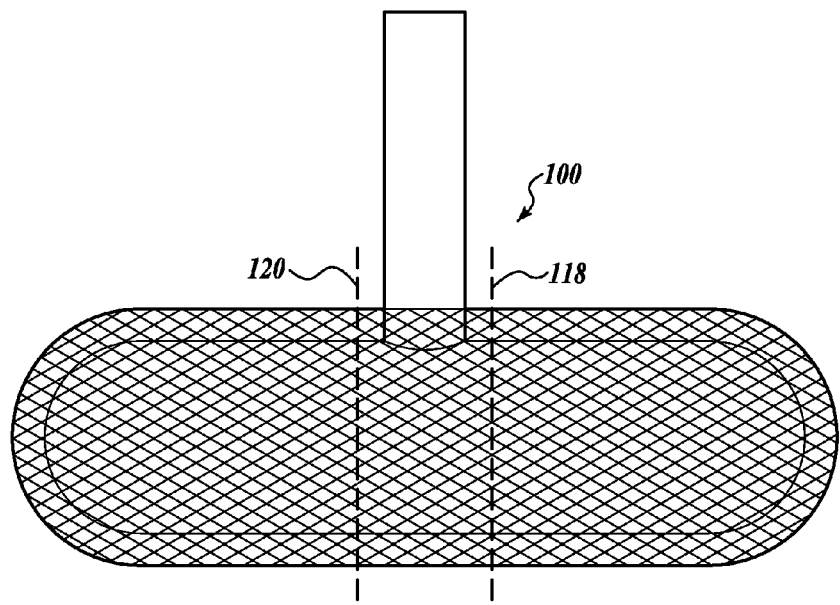
FIG. 5 is a diagrammatical illustration of a step in a method of making the reinforced resin plug.

Referring to FIG. 5, after sufficient curing has taken place, the cured resin with fibrous material embedded therein may be cut circumferentially along the cut lines 118 and 120 illustrated in FIG. 5.

Figure 6:
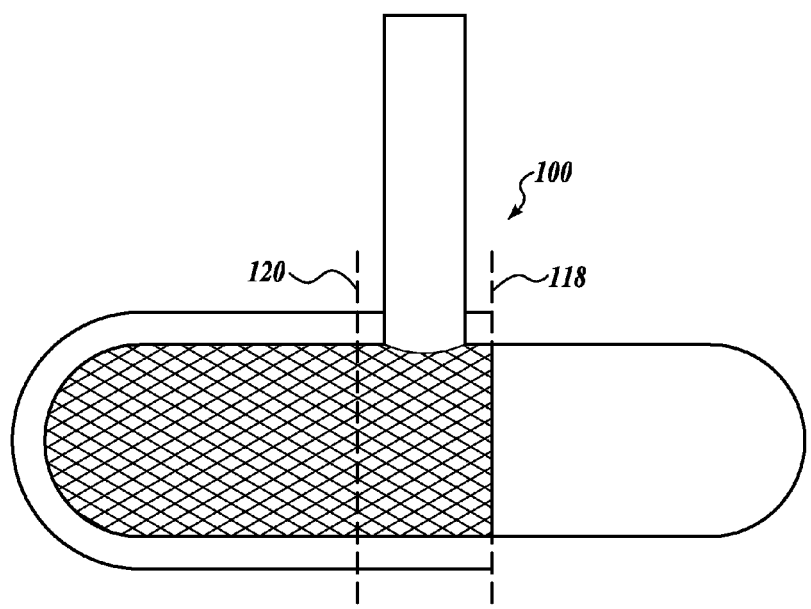
FIG. 6 is a diagrammatical illustration of a step in a method of making the reinforced resin plug.
Figure 7:
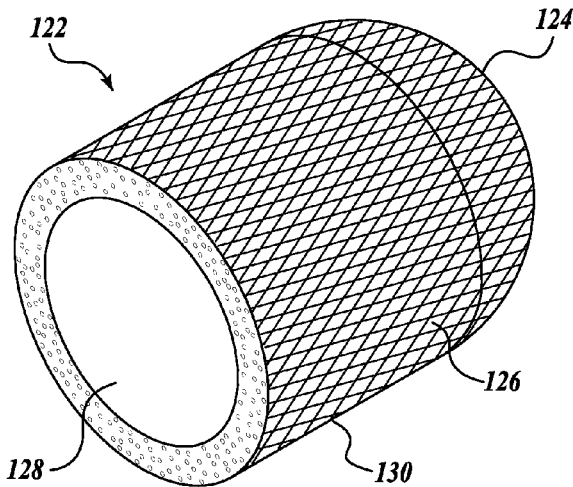
FIG. 7 is a diagrammatical illustration of a reinforced resin plug.

Referring to FIG. 6, one plug has been cut along the cut line 118, which produces the fiber-reinforced resin plug illustrated in FIG. 7. A second plug may be produced by cutting along the cut line 120. The material remaining in the center may be discarded.

Referring to FIG. 7, the plug 122 includes a hollow cylindrical body 130 closed by a rounded end portion 124 and open at the opposite end 128. The plug 122 includes tensioned filaments of fibrous material 126 that extend in a continuous manner from one side of the body 130 across the width of the rounded end 124 and to the opposite side of the body 130. The plug 122 may include a multiplicity of filaments that each extends in a continuous manner from one side of the body across the width of the rounded end 124 and to the opposite side of the body 130. The fibrous material 126 may be continuous filaments of synthetic polymers, such as nylon. Alternatively, the fibrous material 126 may be comprised of individual discrete fibrils that are twisted or woven into a single continuous thread, such as natural or synthetic fibers. The plug 122 may withstand an internal pressure of 50 psig or more, for example.

Figure 8:
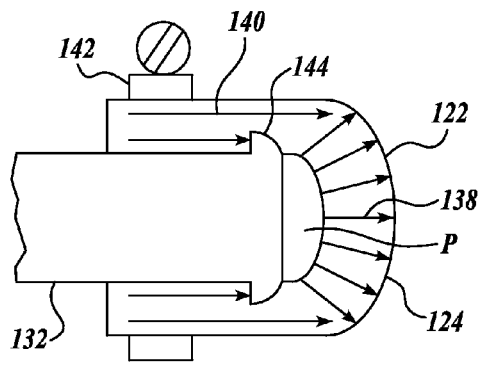
FIG. 8 is a diagrammatical illustration of a method of closing a conduit connector termination using a reinforced resin plug.

Referring to FIG. 8, a method for closing an open conduit connector termination is illustrated. The conduit connector termination 132 has an open end that is desirable to be sealed off to prevent the escape of fluids, for example. The conduit connector termination 132 may be a hose barb including at least one barb 144. The reinforced plug 122 is placed on the conduit connector termination 132. The plug 122 includes a hollow cylindrical body closed by a rounded end portion 124 and open at the opposite end, and the open end is placed over the conduit connector termination 132. A clamp 142 is placed over the hollow cylindrical body that is adjacent to the conduit connector termination 132. In order to better seal the conduit connector termination 132 and withstand the internal pressure, the plug 122 transfers forces 138 experienced at the interior of the rounded end 124 and transfers those forces 140 along the body of the plug 122 via the fibrous material 126 to that portion of the plug that is captured by the compressive force applied by the clamp 142.

Figure 9:
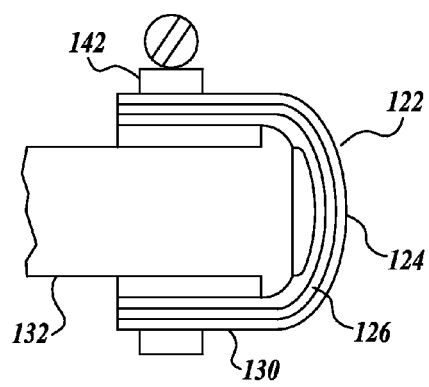
FIG. 9 is a diagrammatical illustration of a method of closing a conduit connector termination using a reinforced resin plug.

As illustrated in FIG. 9, a reinforced plug 122 fitted on the end of a conduit connector termination 132 provides a multiplicity of individual, discrete fibrous materials 126 that extend in a continuous manner from one side of the body 130 of the plug 122, across the width of the rounded end 124, and to the opposite side of the body 130. This allows the ends of the fibrous material 126 near the opening of the plug to be captured by the compressive force of the clamp 142 at the cylindrical body 130. "Continuous" as used herein means having no breaks such that at least one or more continuous fibrous materials 126 extend from one side of the hollow body 130 across the width of the rounded end 124 and terminate at another location at the hollow body 130. A fibrous material 110 may include fibers made from natural or synthetic fibers. Any combination of fibers is also possible. Examples of suitable reinforcing fibers include inorganic fibers, such as fibers made from glass, carbon, and alumina, and organic fibers, such as fibers made from polyamides (nylons or aramids), polyester, aliphatic polyketones, and the like. The fiber diameter of the reinforcing fiber can depend on the diameter of the plug; for example, some fibers can be within a range from 0.1 to 100 µm.

Figure 10:
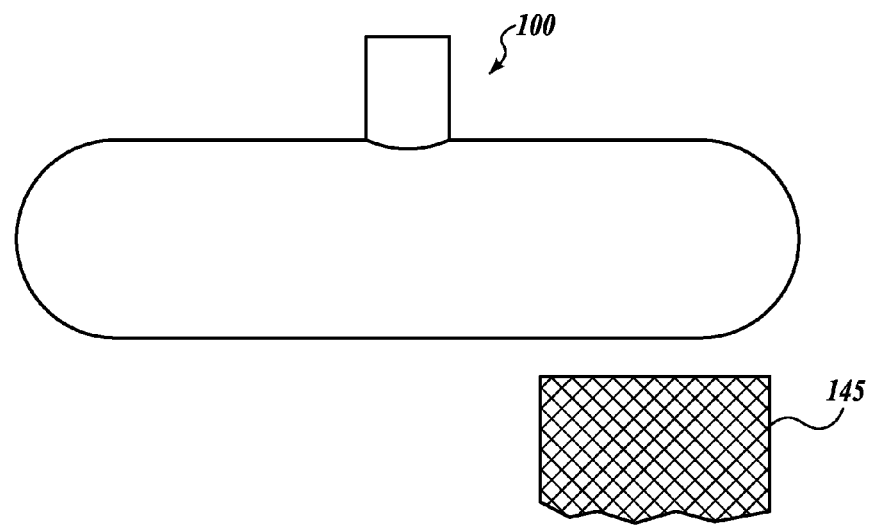
FIG. 10 is an alternate step of a method for making a reinforced resin plug.

Referring to FIG. 10, an alternative step of a method for making a fiber-reinforced resin plug is illustrated. In some embodiments, instead of wrapping the die 100 with a continuous filament of a fibrous material 110 as illustrated in FIG. 2, a mesh 145 may be wrapped around the die 100, also in a manner that applies tension to the fibers forming the mesh 145. In some embodiments, the mesh 145 is a pre-preg material that carries a curable resin together with the mesh material. As in the embodiments described herein, the fibrous material, such as mesh 145, extends in a continuous manner from one side of the die, around or across the rounded end, and continues on another side or location of the body.

Figure 11:
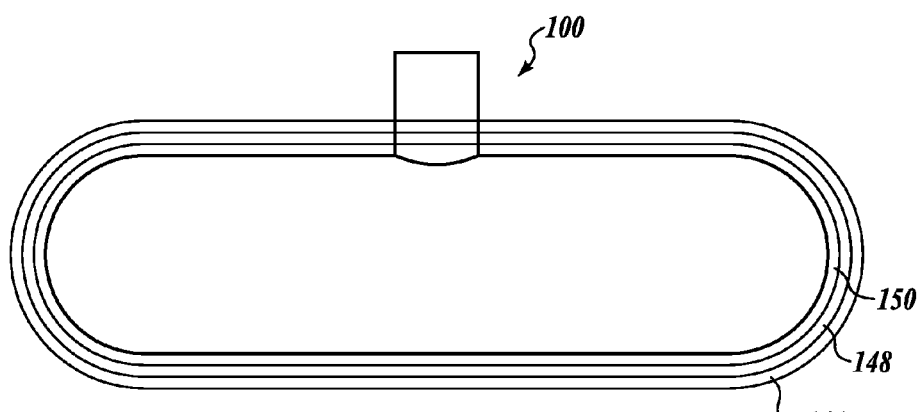
FIG. 11 is an alternate step in a method for making a reinforced resin plug.

Referring to FIG. 11, an alternative method of making a fiber-reinforced resin plug is illustrated. In some embodiments, multiple layers 146, 148, and 150, each comprising a fibrous material and resin, may be applied on the die 100. In some embodiments, a first layer of fibrous material and resin 150 is applied, allowed to cure, a second fibrous material and resin 148 is applied, allowed to cure, and then a final exterior layer of fibrous material and resin 146 is applied and allowed to cure. Then, the individual plugs may be cut from the die 100 as described above. In other embodiments, the layers are applied but are not allowed to cure. That is, the first layer 150 is applied, the second layer of fibrous material and curable resin 148 is applied on top of the uncured layer 150, and then the final and exterior layer of uncured resin and fibrous material 146 is applied on top of the middle layer of fibrous material and uncured resin. Then, the three layers are allowed to cure simultaneously.

Some embodiments are related to a method of making a fiber-reinforced resin plug 122. The method includes providing a die 100 having a cylindrical body 108 terminating in a curved or rounded end 102, 104, wrapping a fibrous material 110 around the die 100 during or while the fibrous material 110 is tensioned, wherein the fibrous material 110 is placed to extend in a continuous manner across the width of the rounded end 102, 104 of the body 108 and to opposite sides of the cylindrical body 108, applying a curable resin 116 on the die 100, curing the resin 116, and removing a reinforced cured resin plug 122 from the die 100.

In the embodiments related to the method of making a reinforced resin plug 122, the die 100 may further include a pole 106 connected to the cylindrical body 108, wherein the pole 106 extends perpendicular to a longitudinal axis of the cylindrical body 108.

In the embodiments related to the method of making a reinforced resin plug 122, removing the plug 122 includes cutting the cured fiber-reinforced resin plug 122 around the circumference of the die 100 on both sides of the pole 106 to produce two reinforced resin plugs 122.

In the embodiments related to the method of making a reinforced resin plug 122, the fibrous material 110 can be applied before the curable resin 116.

In the embodiments related to the method of making a reinforced resin plug 122, the curable resin 116 can be applied before the fibrous material 110.

In the embodiments related to the method of making a reinforced resin plug, the curable resin 116 and the fibrous material 110 can be applied together.

In the embodiments related to the method of making a reinforced resin plug 122, the method may further include tensioning the fibrous material 110 when the fibrous material 110 is applied on the die 100.

In the embodiments related to the method of making a reinforced resin plug 122, the fibrous material 110 can include spun filaments.

In the embodiments related to the method of making a reinforced resin plug 122, the fibrous material 110 can include a continuous filament.

In the embodiments related to the method of making a reinforced resin plug 122, the fibrous material 110 can be a mesh 145 of interconnected filaments.

In the embodiments related to the method of making a reinforced resin plug 122, the curable resin 116 can be an elastomer, such as, but not limited to, silicone, ethylene propylene diene monomer, or rubber.

Some embodiments are related to a reinforced plug 122. The reinforced plug 122 may include a hollow cylindrical body 130 closed by a rounded end portion 124 and open at the opposite end 128, wherein the plug 122 comprises tensioned fibrous material 126 that extends in a continuous manner across the width of the rounded end 124 and to the sides of the body 130.

In the embodiments related to the reinforced plug 122, the fibrous material 126 may include a plurality of discrete filaments, at least one or more extending in a continuous manner across the width of the rounded end 124 and to the sides of the body 130.

In the embodiments related to the reinforced plug 122, the fibrous material 110 may include a mesh 145.

In the embodiments related to the reinforced plug 122, the plug 122 may include more than one layer 146, 148, 150, each layer 146, 148, 150 having tensioned fibrous material 110 and resin 116.

In the embodiments related to the reinforced plug 122, the plug 122 may include at least one layer 146, 148, 150 having a cured resin 116 and further includes the fibrous material 110 within the resin 116.

In the embodiments related to the reinforced plug 122, the plug 122 may include more than one layer 146, 148, 150 of cured resin 116 and fibrous material 110.

Some embodiments are related to a method for closing a conduit connector termination 132. The method includes placing a plug 122 made from a reinforced resin 116 on a conduit connector termination 132, wherein the plug 122 comprises a hollow cylindrical body 130 closed by a rounded end portion 124 and open at the opposite end 128, wherein the open end 128 is placed over the conduit connector termination 132; placing a clamp 142 on the plug 122 that compresses the plug body 130 to the conduit connector termination 132, wherein the plug 122 comprises a tensioned fibrous material 126 that extends across the width of the rounded end 124 and to the sides of the body 130 in a continuous manner.

In the embodiments related to a method for closing a conduit connector termination 132, the pressure inside the conduit connector termination 132 applies a force 138 on an inside surface of the rounded end 124 of the plug 122, and the force 138 is partly transferred via the fibrous material 126 to a body portion 130 being compressed by the clamp 142, thereby providing for added strength.

In the embodiments related to a method for closing a conduit connector termination 132, the conduit connector termination 132 can be a hose barb 144.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for closing a barbed conduit connector termination of a vehicle, comprising:
   placing a plug made from a reinforced resin on a barbed conduit connector termination on a vehicle, wherein the plug comprises a hollow cylindrical body and a rounded end portion having a curvature in the radial direction, wherein the hollow cylindrical body is closed by the rounded end portion on one end, and the cylindrical body has an open opposite end, wherein the hollow cylindrical body and rounded end portion are continuously joined, wherein the plug comprises tensioned fibrous material that extends in a continuous manner from one side of the cylindrical body in a lengthwise manner along the body, then across the width of the rounded end, and then to an opposite side of the cylindrical body in a lengthwise manner along the body;
   placing the open end over the barbed conduit connector termination, wherein the hollow cylindrical body fits juxtaposed outside on the barbed conduit connector termination; and
   placing a clamp on the plug that compresses the cylindrical body to the barbed conduit connector termination.

2. The method of claim 1, wherein a pressure inside the barbed conduit connector termination applies a force on an inside surface of the rounded end, and the force is transferred via the fibrous material to a body portion being compressed by the clamp.

3. The method of claim 1, wherein the barbed conduit connector termination is a hose barb.

4. The method of claim 1, wherein a pressure inside the plug is 50 psig or more.

5. The method of claim 1, wherein the fibrous material comprises a plurality of discrete filaments, at least one or more extending in a continuous manner across the width of the rounded end and to the sides of the body.

6. The method of claim 1, wherein the fibrous material comprises a mesh.

7. The method of claim 1, wherein the plug comprises more than one layer, each layer having tensioned fibrous material and resin.

8. The method of claim 1, wherein the plug comprises at least one layer having a cured resin, and further comprises the fibrous material within the resin.

9. The method of claim 1, wherein the plug is made from an elastomer.

10. The method of claim 9, wherein the elastomer is silicone rubber, butyl rubber, ethylene propylene rubber, ethylene propylene diene rubber, polyisoprene rubber, polybutadiene rubber, or nitrile rubber.

* * * * *